United States Patent [19]
Chen

[11] Patent Number: 6,108,047
[45] Date of Patent: Aug. 22, 2000

[54] VARIABLE-SIZE SPATIAL AND TEMPORAL VIDEO SCALER

[75] Inventor: Ting-Chung Chen, San Jose, Calif.

[73] Assignee: Stream Machine Company, San Jose, Calif.

[21] Appl. No.: 08/959,314

[22] Filed: Oct. 28, 1997

[51] Int. Cl.[7] ................................................... H04N 7/01
[52] U.S. Cl. ............................................. 348/581; 348/448
[58] Field of Search .................................. 348/581, 448, 348/452; 382/260, 298, 299, 300; 358/478, 525, 528; H04N 7/01, 11/20

[56] References Cited

U.S. PATENT DOCUMENTS

| | | |
|---|---|---|
| 5,089,893 | 2/1992 | Iwase et al. . |
| 5,283,651 | 2/1994 | Ishizuka et al. . |
| 5,384,904 | 1/1995 | Sprague et al. . |
| 5,574,572 | 11/1996 | Malinowski et al. . |
| 5,621,870 | 4/1997 | Shyu et al. . |
| 5,671,018 | 9/1997 | Ohara ........................................ 348/452 |
| 5,742,343 | 4/1998 | Haskell ..................................... 348/415 |
| 5,793,435 | 8/1998 | Ward ......................................... 348/448 |

*Primary Examiner*—Sherrie Hsia
*Attorney, Agent, or Firm*—Fernandez and Associates, LLP.

[57] ABSTRACT

Digital video signal processor scales in spatial and temporal domains. Linear, time-varying filter provides variable-size scaling of progressive and interlace-scan formats. Temporally, frame-rate conversion is accomplished using motion compensation. Vertical line-doubling and de-interlacing is achieved with line-based motion estimation. Bilinear interpolation provides low filtering distortion; other linear and spline functions are implemented using equivalent control functionality and arithmetic datapaths.

18 Claims, 12 Drawing Sheets

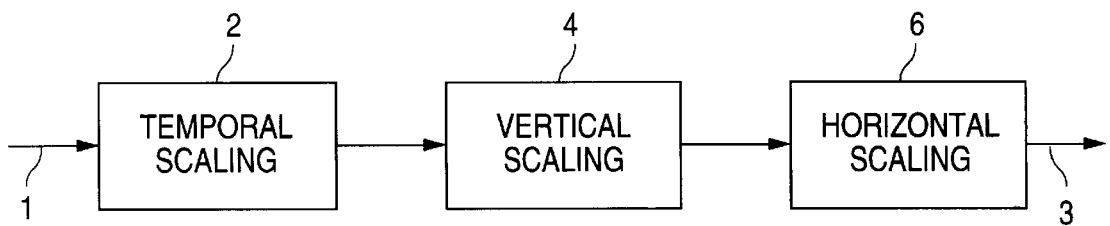

FIG. 1A

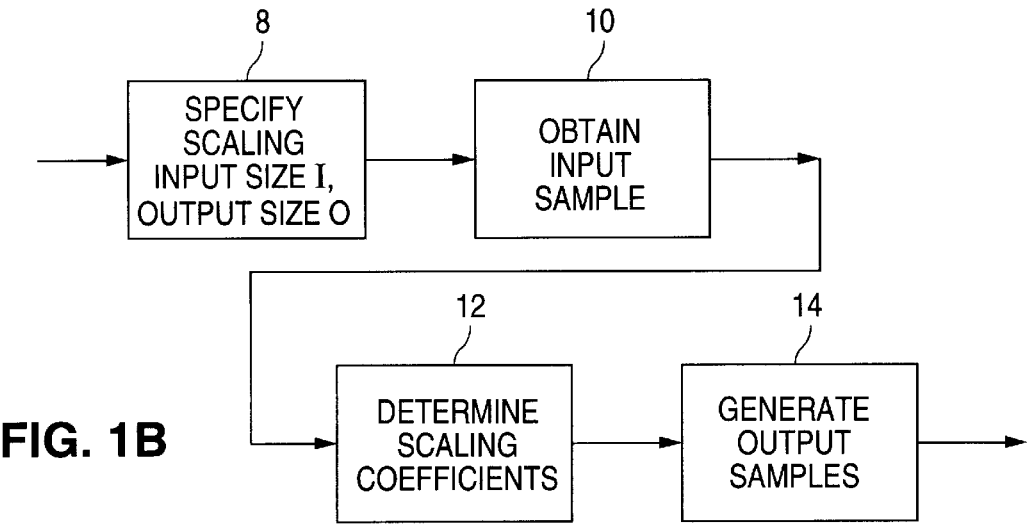

FIG. 1B

I/O = input_picture_size/output_picture_size

```
         // implementation using modulo and division operations
         n = 0;
         for (j = 0;j < O; j++)
         {
 16              k = n%O; // used for scaling
                 m = n / O; // used for input indexing
                 n = n + I;
                 output[j] = ((O-k) * input[m] + k * input[m+1]) / O;
         }
```

```
         // implementation using only multiplication operations
         n = 0;
         p = 1 / O;
         for (j = 0;j < O; j++)
         {
 18              m = int (n * p); // take the integer part
                 kl = n - m * O;
                 n = n + I;
                 output[j] = ((O-k) * input[m] + k * input[m+1]) / O;
         }
```

FIG. 2

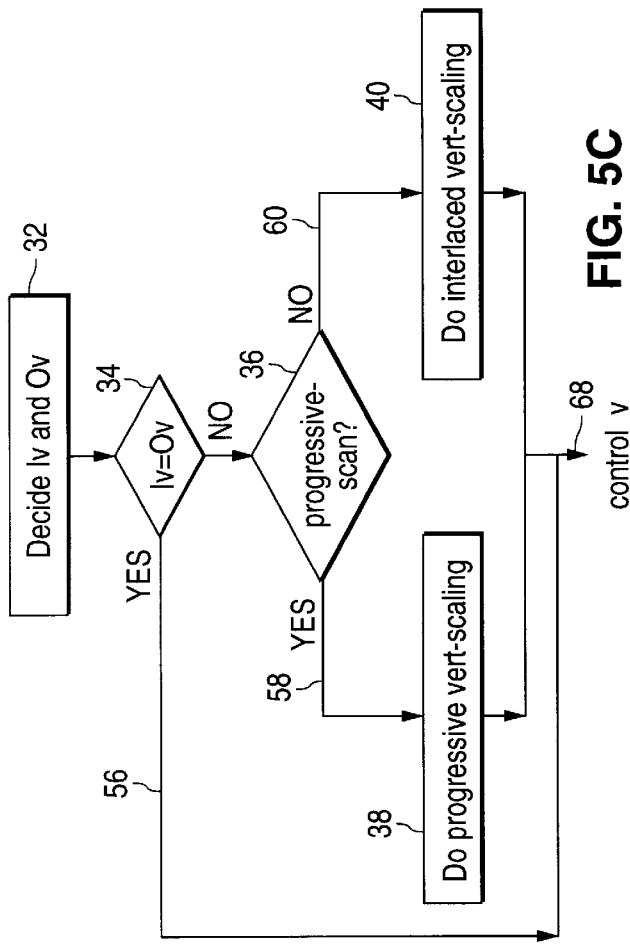
FIG. 5A
FIG. 5C
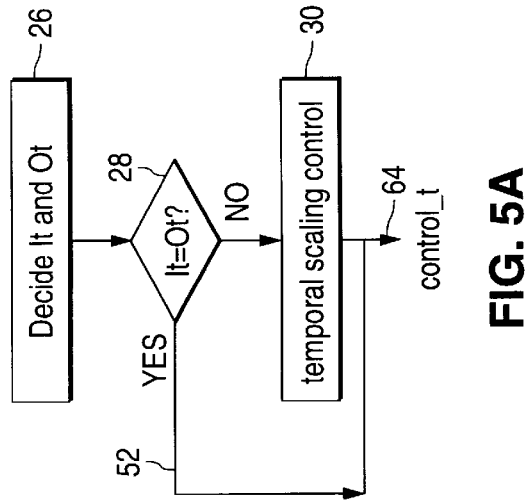
FIG. 5B
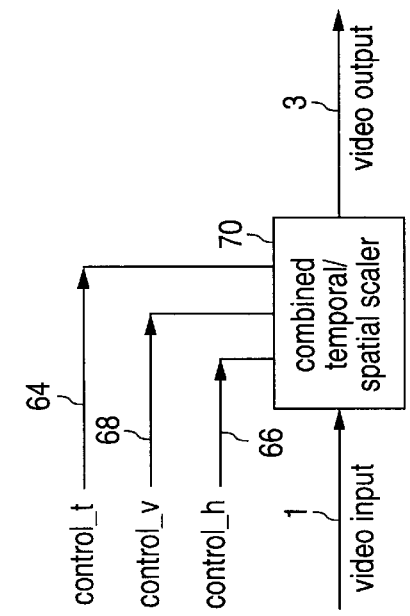
FIG. 5D

INPUT LINES
84

OUTPUT LINES
86

L0 ─────────────  ─────────────  out_0 = L0

─────────────  out_1 = .75xL1 + .25xL-1

L1 ─────────────  ─────────────  out_2 = 0.5xL0 + 0.5xL2

─────────────  out_3 = .75xL1 + .25xL3

L2 ─────────────  ─────────────  out_4 = L2

─────────────  out_5 = .25xL1 + .75xL3

L3 ─────────────  ─────────────  out_6 = 0.5xL2 + 0.5xL4

─────────────  out_7 = .75xL3 + .25xL5

FIG. 11

INPUT LINES
84

OUTPUT LINES
86

L0 ─────────────  ─────────────  out_0 = L0

─────────────  out_1 = .5xMC(L0) + .5xL1

L1 ─────────────  ─────────────  out_2 = .5xL0 + .5xL2

─────────────  out_3 = .5xL1 + .5xMC(L2)

L2 ─────────────  ─────────────  out_4 = L2

─────────────  out_5 = .5xMC(L2) + .5xL3

L3 ─────────────  ─────────────  out_6 = 0.5xL2 + 0.5xL4

─────────────  out_7 = .5xL3 + .5xMC(L4)

FIG. 12

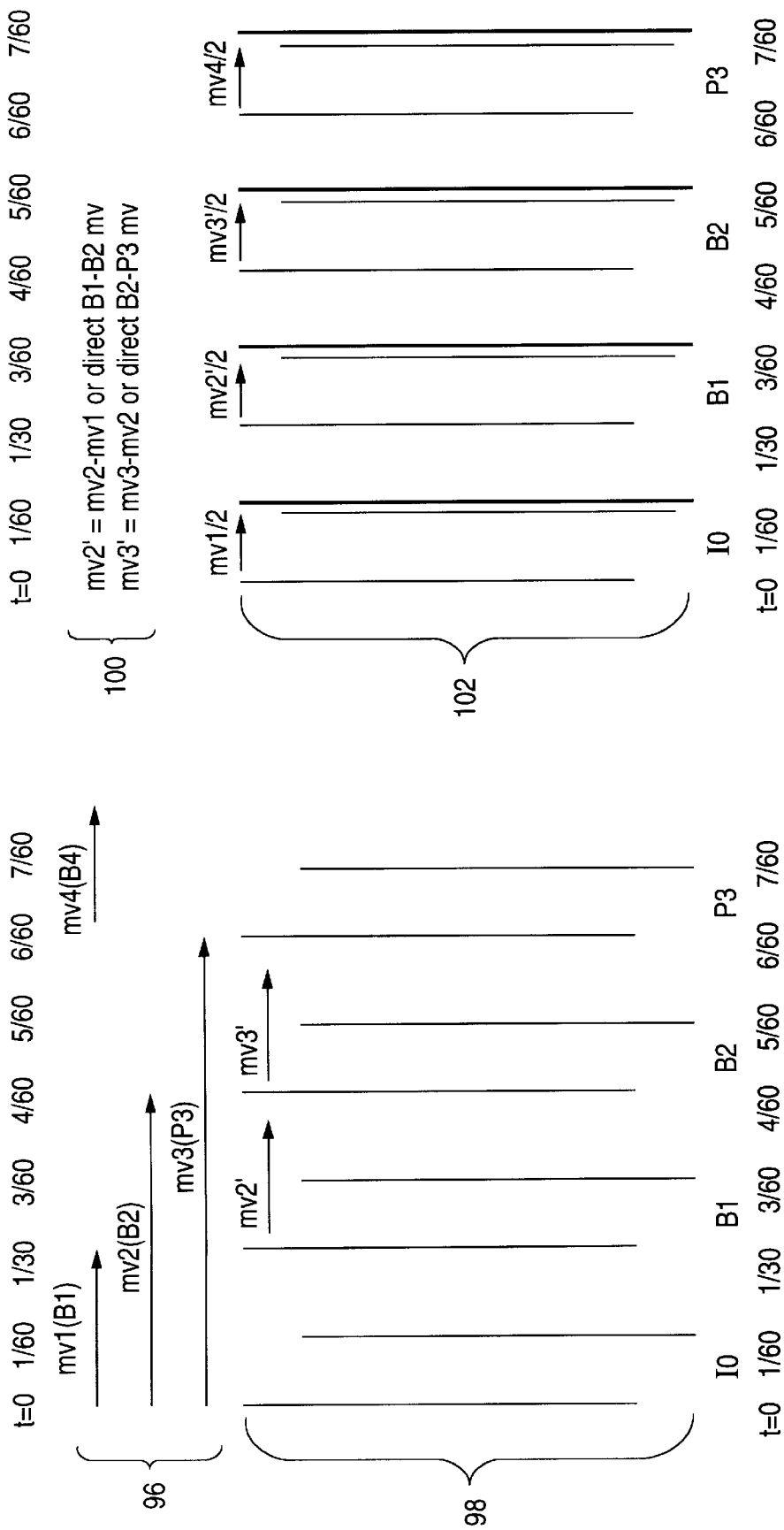

```
        INPUT LINES        OUTPUT LINES
            84                 86
L0 ─────────────    ─────────────  out_0 = A x MC(L0)+(1-A) x avg(L1)
L1 ─────────────    ─────────────  out_1 = L1
L2 ─────────────    ─────────────  out_2 = A x MC(L2)+(1-A) x avg(L1, L3)
L3 ─────────────    ─────────────  out_3 = L3
```
FIG. 14A
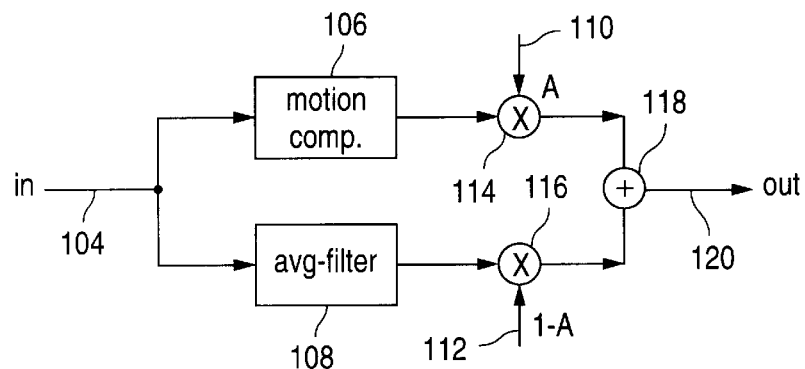
FIG. 14B
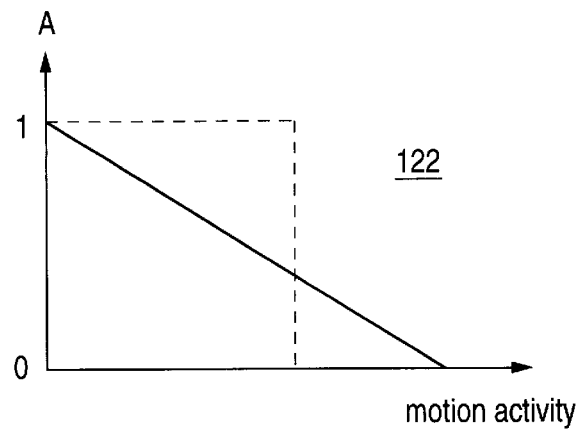
FIG. 14C

VARIABLE-SIZE SPATIAL AND TEMPORAL VIDEO SCALER

BACKGROUND OF THE INVENTION

1. Field of the Invention

The invention relates to digital signal processing, particularly to electronic image processing of video signals to provide spatial and/or temporal scaling.

2. Description of Background Art

Various video formats are currently in use, depending on the particular source of the video signal. For example, video output dimensions are defined one way for conventional television screens and yet other dimensions for cinema or movie theater presentation. Furthermore, video recording format varies significantly between U.S. and European standards (i.e., PAL vs. NTSC). Additionally, video signals are transmitted using different frame rates when displayed on computer screens, as opposed to television screens.

Conventionally, video output is scaled spatially, i.e., horizontally and/or vertically, to desired dimensions by simple window-cropping, direct decimation, or direct repetition. However, such conventional techniques tend to cause loss of viewing information or introduce annoying viewing artifacts. In the prior art, there are number of filtering techniques that address such issue. For example, see: U.S. Pat. No. 5,574,572 to Malinowski et al. which describes time-invariant, spatial scaling for progressive-scan video; U.S. Pat. No. 5,621,870 to Shyu et al. which describes uniform spatial scaling for progressive-scan video; U.S. Pat. No. 5,089,893 to Iwase et al. which describes spatial picture element number converter for interlaced video; U.S. Pat. No. 5,283,651 to Ishizuka et al. which describes spatial scaling for interlaced video; and U.S. Pat. No. 5,384,904, to Sprague et al. which describes spatial scaling for progressive scan video.

Such conventional video scaling techniques tend to be quite complicated to implement, often requiring substantial amounts of storage and arithmetic processing. Hence, there is a need to provide improved technique for formatting video signals in much more efficient manner. In particular, it is desirable to scale the video input signal to certain output signal having certain spatial as well as temporal formats.

SUMMARY OF THE INVENTION

The invention resides in an electronic processing methodology and circuit for scaling a digital signal in spatial and temporal domains. Variable-size scaling of video data is performed by applying to an input video signal a linear, time-varying filter to generate desired output signal. Progressive and interlace-scan formats are scaled according to spatial as well as temporal constraints. Particularly in the temporal domain, frame-rate conversion is accomplished using motion compensation, as well as temporal scaling. Additionally vertical line-doubling and de-interlacing is achieved, in combination with line-based motion estimation. Preferably, bilinear interpolation provides low filtering distortion, while other linear and spline functions are also implemented using substantially equivalent control functionality and arithmetic datapaths. Hence, inventive video processor scales input video source to output video display with viewing quality featuring smooth motion rendition, sharp spatial resolution, and proper display aspect ratio.

BRIEF DESCRIPTION OF THE DRAWINGS

FIGS. 1A–B are generalized flow charts of digital video signal processing methodology according to the present invention.

FIG. 2 is sample pseudo c-code for calculating bi-linear interpolated output pixels according to present invention.

FIGS. 5A–D are methodology flow charts for implementing respectively temporal, horizontal, vertical, and overall combined scaling according to the present invention.

FIG. 11 is a diagram showing basic line doubler with two lines memory for interlaced video according to the present invention.

FIG. 12 is a diagram showing basic line doubler with one field and one line memory and using motion compensation for interlaced video according to the present invention.

FIGS. 13A–B are diagrams showing respectively regular output interlaced display and output display de-interlacing according to the present invention.

FIGS. 14A–C are diagrams showing respectively de-interlacing with motion compensation with one field and two lines of memory and motion compensation, corresponding schematic diagram, and selection function according to the present invention.

DETAILED DESCRIPTION OF THE PREFERRED EMBODIMENT

Figure 3A:
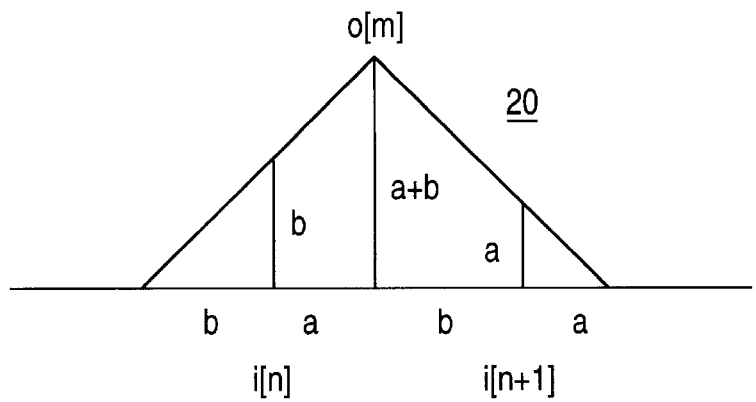
FIGS. 3A–C are diagrams showing scaling functions respectively for bi-linear, tri-linear, and quad-linear interpolation according to the present invention.

FIG. 1A is simplified flow chart of inventive digital signal processing methodology or electronic system preferably implemented as single-pass linear filter (e.g., finite impulse response (FIR)) for variably scaling video information temporally and/or spatially (i.e., vertically and/or horizontally) in complementary metal oxide semiconductor (CMOS) integrated circuit and/or functionally equivalent software code. Thus, input video signal 1 is received for temporal scaling 2, then vertical scaling 4, followed by horizontal scaling 6, to generate output video signal 3. FIG. 1B is simplified flow chart related to FIG. 1A showing initially upon receiving input video signal that scaling input size I and output size O are specified 8, input sample is obtained 10 therefrom, scaling coefficients are determined 12, and output samples are generated 14.

Essentially, inventive approach embodies finite-precision circuit or technique for determining scaling coefficients or values for input video signal 1 and linear filtering according to such scaling coefficients to scale spatially and/or temporally input signal to generate scaled output. Preferred video system includes source of input video signal (e.g., interlace or progressive scan video format), novel filtering scheme (i.e., spatial and/or temporal video scaler) which calculates one or more scaling coefficients related to input signal for filtering such signal to generate scaled signal for output by conventional video display equipment.

According to present innovation, digital video signal processing approach scales in spatial and/or temporal domains. Linear, time-varying filter provides variable-size scaling of progressive and interlace-scan formats. Temporally, frame-rate conversion is accomplished using motion compensation. Vertical line-doubling and de-interlacing is achieved with line-based motion estimation. Bi-linear interpolation provides low filtering distortion; other linear and spline functions are implemented using equivalent control functionality and arithmetic datapaths.

As defined herein, video scaling arises when video presentation changes from input format to desired output format, which includes frame rate, picture height, and/or picture width. Temporal video scaling involves changing video frame rate (i.e., number of frames per second in moving video presentation) from input to output, whereas vertical video scaling involves changing video picture height (i.e., number of lines per frame in moving video presentation) from input to output, and horizontal video scaling involves changing video picture width (i.e., number of pixels or pels per line in video frame) from input to output.

Also, filtering refers to technique for extracting frequency components from signal. For example, interpolation and decimation filtering obtain low-pass information from signal, both using low-pass filtering. With interpolation, more discrete representation points are generated between discrete input sample points of a function, whereas with decimation, less discrete representation points are generated between discrete input sample points of the function, wherein representation points are captured either in space or in time.

Moreover, finite-impulse-response (FIR) filter has finite taps, where each output point is calculated based on finite number of input samples. Thus, symmetric FIR filters have linear phase, wherein output points are delayed equally from input points, which is desirable in video signal processing.

Furthermore, linear filtering is defined such that f is a linear filter when filter operator and x, y are input signals, and f(ax+by)=af(x)+bf(y) is true. Additionally, time-varying filter is defined by filter whose impulse response is time-varying, i.e., filter coefficients differ with time when input changes. Hence, for time-invariant filter, impulse response is time-invariant, and filter coefficients are same regardless of input change.

As implemented herein, initially scaling ratios between input and output values are specified for filtering operation. For temporal scaling, using motion compensation with linear scaling, ratio is:

$$It/Ot=input\_frame\_rate/output\_frame\_rate$$

For vertical scaling, for progressive scan video format, ratio is:

$$Iv/Ov=input\_vert\_size/output\_vert\_size$$

Additionally, for interlace scan video format, input and output lines are ordered sequentially, even number of output lines are generated from first field, and odd number of output lines are generated from second field. For horizontal scaling, ratio is:

$$Ih/Oh=input\_horiz\_size/output\_horiz\_size.$$

From calculated input to output scaling ratios, distances of each output frame, line, or pel to closest two or more neighboring inputs are calculated recursively. Based on two or more distances, time-varying interpolation filter coefficients are calculated recursively.

Hence, referring to FIG. 1B, input and output scaling values or coefficients are specified 8, generally by dividing input picture size or frame rate by output picture size or frame rate. I/O ratio is used for scaling calculation herein. Preferably, I and O values are reduced to prime or non-reducible pair, and scaling algorithm generates repeated pattern for processing, e.g., when desired output picture size larger than O. Both O>=I and O<I cases generate repeated processing patterns.

Input sample is obtained 10 preferably when scaling up (i.e., O>I), such that for I inputs, O output samples are generated substantially evenly, spanning O output clocks. To avoid buffering extra inputs, input sample is taken every O/I output clocks, and index kept that is reset to zero after every O output clocks are registered. In this manner, index is incremented by I/O for every output clock, and fraction value I/O stored in finite precision and multiples thereof are truncated to leading integer. Whenever such value crosses integer boundary, new sample is input for interpolation. Since finite O values are possible, fractions (i.e., I/O's) are stored, thereby eliminating divisions for calculating such values in real time.

Moreover, when scaling down (i.e., O<I), input sample is obtained 10 preferably using equivalent approach, however, increment of 1/O may have integer portion incremented by two or more. In this way, more than one input sample is input for interpolation, whereby input buffer control is used.

Scaling coefficients are determined 12 using relatively short-kernel linear interpolations, in order to reduce ringing artifact crossing sharp edges in picture. Output sample is interpolated from two to four of close neighbor input samples. In simple bi-linear form, for example, inverse of distance of output sample to two neighboring input samples, thereby determining scaling coefficients. In this case, calculation is accomplished by multiples of 1/O and distance from neighboring integer grids.

To generate output samples 14, scale factor (i.e., sum of (scale_i)) is used to constrain output range to be substantially same as input pel range. Hence, following calculation is provided:

$$Output=(sum\ of\ (neighbor\_i \times scale\_i))/(sum\ of\ (scale\_i)).$$

Since sum of (scale_i)=0, and 1/O is stored in fractions, such calculation is implemented by multiplication, accumulation, and right-shifting of result by scale bits. Preferably, output-ready signal is asserted when output sample is provided, and three channels of YUV video signal format are multiplexed in single data stream for interfacing to output display device.

For representative illustration, contemplated (although not exhaustive) resizing range samples are provided from (e.g., 352, 384, . . . ) to 704 preferably using 2-point time-varying linear interpolation (since sum of ("scale_i")= 0), as follow:

```
352 -> 704 (x2/1)(1 0) (1/2 1/2)period: 2
384 -> 704 (x22/12) {(1 0) (10 12)/22} {(20 2)/22 (8 14)/22}
{(18 4)/22 (6 16)/22} {(16 6)/22 (4 18)/22}
{(14 8)/22 (2 20)/22} {(12 10)/22}period: 12
352 -> 704 (x22/11)I = 11 O = 22
384 -> 704 (x22/12)I = 12 O = 22
416 -> 704 (x22/13)I = 13 O = 22
448 -> 704 (x22/14)I = 14 O = 22
480-> 704 (x22/15)I = 15 O = 22
512 -> 704 (x22/16)I = 16 O = 22
544 -> 704 (x22/17)I = 17 O = 22
576 -> 704 (x22/18)I= 18 O = 22
608 -> 704 (x22/19)I = 19 O = 22
```

Additionally, resizing samples from 704->640 (NTSC) and 704→768 (PAL) for square pel display are provided, as follow:

704→640 (x 10/11)I=11 n=10

704→768 (x 12/11)I=11 n=12

Further, resizing sample for letterbox format, i.e., from 480 lines to 360 lines, or 576 lines to 432 lines is provided as follows. Letterboxing ordinarily displays 5:3 ratio for cinema video on 4:3 television monitor, such that output appears stretched video with two black bands on top and bottom of monitor, thereby preserving aspect ratios and full picture information. Display aspect ratio (DAR) pertains to ratio of display_pel_width to display_pel_height, and sample aspect ratio (SAR) follows: SAR=DAR*picture_width/picture_height.

480→360 (x3/4) I=4 O=3

Moreover, resizing samples for telecine format, i.e., converting 24 frames/sec. cinema to 30 frames/sec NTSC television, (or vice-versa for inverse-telecine format) are provided, as follows. Telecine formatting from 24-frame cinema to 30-frame television display (i.e., 3:2 pull-down technique) effectively converts frame to 2 or 3 television fields (e.g., 4 cinema frames A, B, C, D, convert to 5 television frames (Ao, Ae), (Bo, Be), (Bo, Ce), (Co, De), (Do, De)). Field inversion occurs every time 3-field pull-down happens.

```
23 -> 30 (x5/4) I = 4 O = 5    temporal direction (telecine)
30 -> 24 (x4/5) I = 5 O = 4    temporal direction (inverse-telecine)
```

FIG. 2 is sample pseudo c-code for calculating bi-linear interpolated output pixels, wherein implementation using modulo and division operations 16 and implementation using only multiplication operations 18 are shown.

Preferably, present scaling approach introduces effectively no or minimum visual artifacts as well as uses significantly reduced storage, for example, two registers for horizontal scaling, and two lines for vertical scaling, while still accommodating variable input and output sizes. Also, preferably, simple finite-precision arithmetic is accomplished using short fixed-length adders and multipliers to replace divisions, modulo operations, as well as any floating point operations. Real-time control circuit with fixed-length accumulator decide when to input new pels and lines, and when to output pels and lines, thereby using reduced memory.

Improved video quality with uniform scaling is achieved, particularly with variable-size ratio having accuracy proportional to precision of finite-wordlength arithmetic approximation, output video being uniformly scaled as specified, and fine video details being less filter-distorted.

Although generating less spatial edge-transition artifacts like edge-ringing, short FIR filter includes more aliasing in frequency domain. In audio, longer filters with less frequency domain aliasing to perform better because hearing is more frequency dependent. In video, short kernel filters are preferred since viewing is keener in spatial domain and processing complexity is proportional to filter length.

Figure 3B:
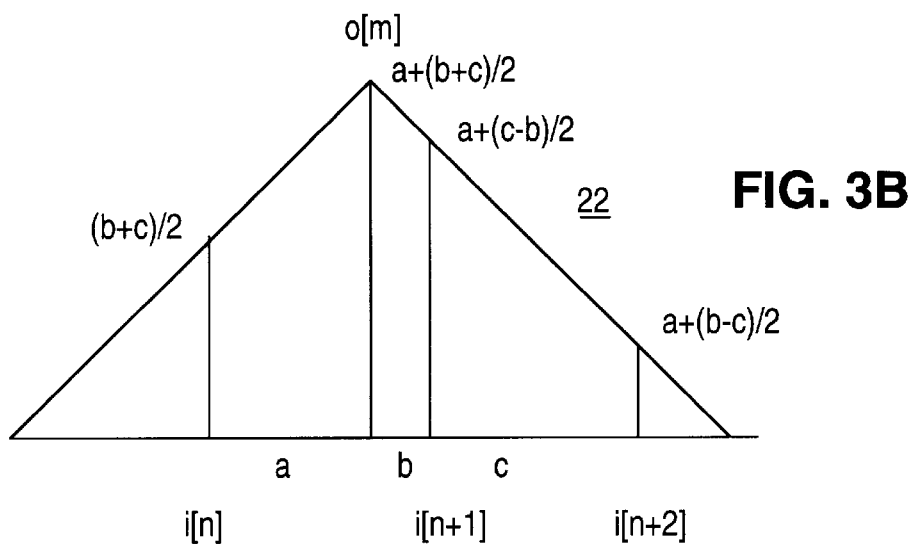
Figure 3C:
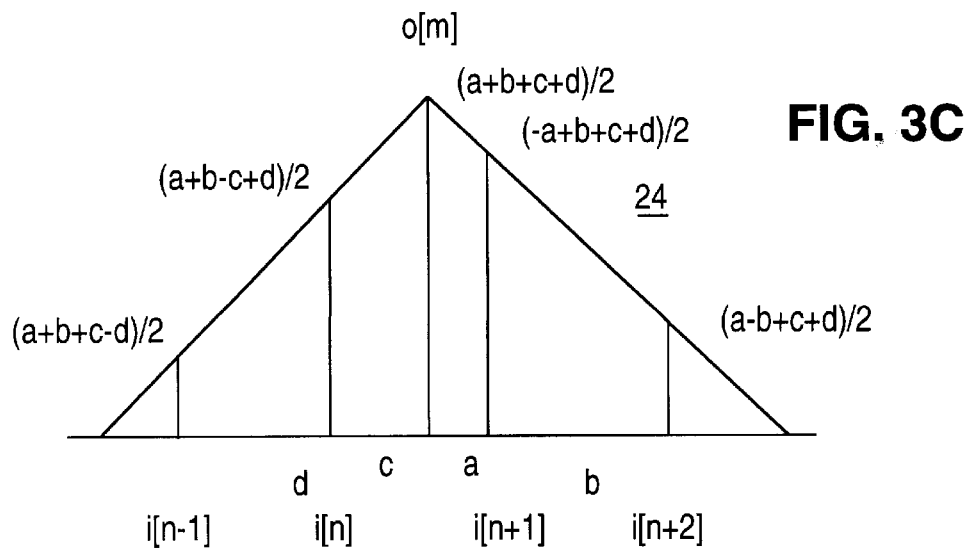

FIGS. 3A–C show scale function diagrams respectively for bi-linear 20, tri-linear 22, and quad-linear 24 interpolation. As described herein, bi-linear interpolation calculations are described for implementing preferred embodiment, however, it is contemplated as well that tri-linear, quad-linear and other similar interpolation techniques may be used to achieve equivalent functionality. Spline functions may be used also to replace linear function straight lines for curve interpolation.

In FIG. 3A, bi-linear interpolation is provided with inputs at locations n and n+1, and output at location m, when m−n=a and n+1−m=b, according to following:

$$o[m]=(b*i[n]+a*i[n+1])/(a+b)$$

In FIG. 3B, tri-linear interpolation is provided with inputs at locations n, n+1, n+2, and output at m, when m−n=a, n+1−m=b, n+2−m=c, wherein x=(b+c)/2, y=a+(c−b)/2, z=a+(b−c)/2, and x+y+z=2a+(b+c)/2, according to following:

$$o[m]=(x*i[n]+y*i[n+1]+z*i[n+2])/(x+y+z)$$

In FIG. 3C, quad-linear interpolation is provided with inputs at locations n−1, n, n+1, n+2, and output at m, when m−n+1=d, m−n=c, n+1−m=a, n+2−m=b, wherein x=(a+b+c+d)/2, y=(a+b−c+d)/2, z=(−a+b+c+d)/2, and w=(a−b+c+d)/2, x+y+z+w=a+b+c+d, according to following:

$$o[m]=(x*i[n-1]+y*i[n]+z*i[n+1]+w*i[n+2])/(x+y+z+w)$$

Figure 4:
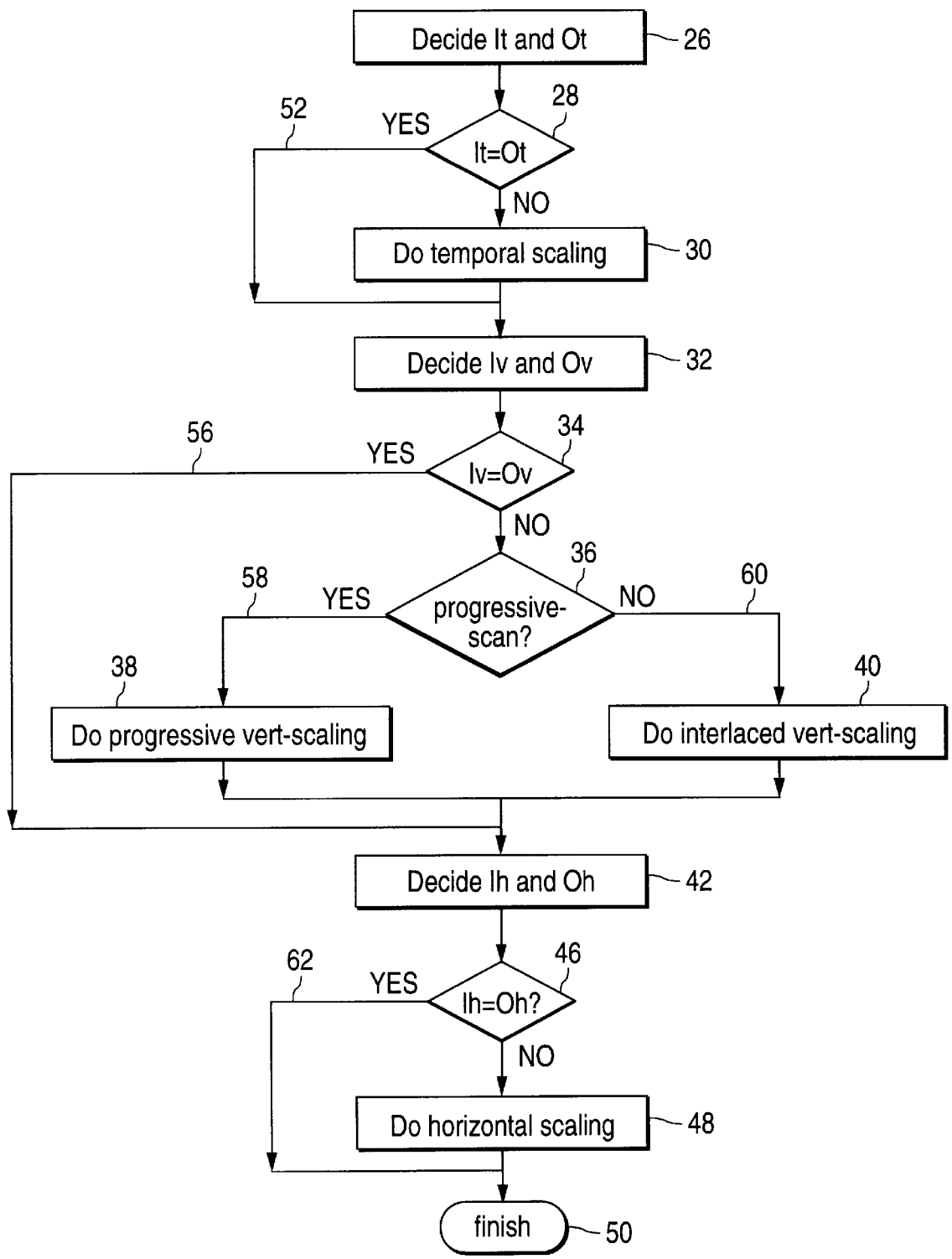
FIG. 4 is an overall methodology flow chart for implementing variable-size spatial-temporal video scaler according to the present invention.

As referred to generally hereunder, FIG. 4 is flow chart for implementing variable-size scaling, showing integrated temporal and spatial analysis and digital video processing, as implemented preferably on-chip using signal processing datapath. Initially, temporal processing proceeds with determining It and Ot 26, such that temporal scaling 30 occurs when It does not equal Ot (i.e., change frame rate) 28, otherwise proceed 52 to spatial processing.

Temporal scaling 30 includes initially calculating two closest input frames of output frame, doing bloc k motion compensation from input_frame_1 to input_frame_2 if calculated motion vector is MV, and distance from input_frame_1 to output-frame is At, distance from input_frame_2 to output_frame is Bt, scale motion vector as follows:

$$s\_f\_t=At/(At+Bt)$$

$$s\_b\_t=Bt/(At+Bt)$$

$$mv\_f=s\_f\_t*MV=(mv\_f\_x, mv\_f\_y)$$

$$mv\_b=-s\_b\_t*MV=(mv \cdot b\_x, mv\_b\_y)$$

Then, determine output_frame from linear combination of two input frames as follows:

$$\text{output\_frame}[j][i] =$$
$$s\_b\_t * \text{input\_frame\_1}[j+mv\_f\_y][i+mv\_f\_x] +$$
$$s\_f\_t * \text{input\_frame\_2}[j+mv\_b\_y][i+mv\_b\_x].$$

Figure 6:
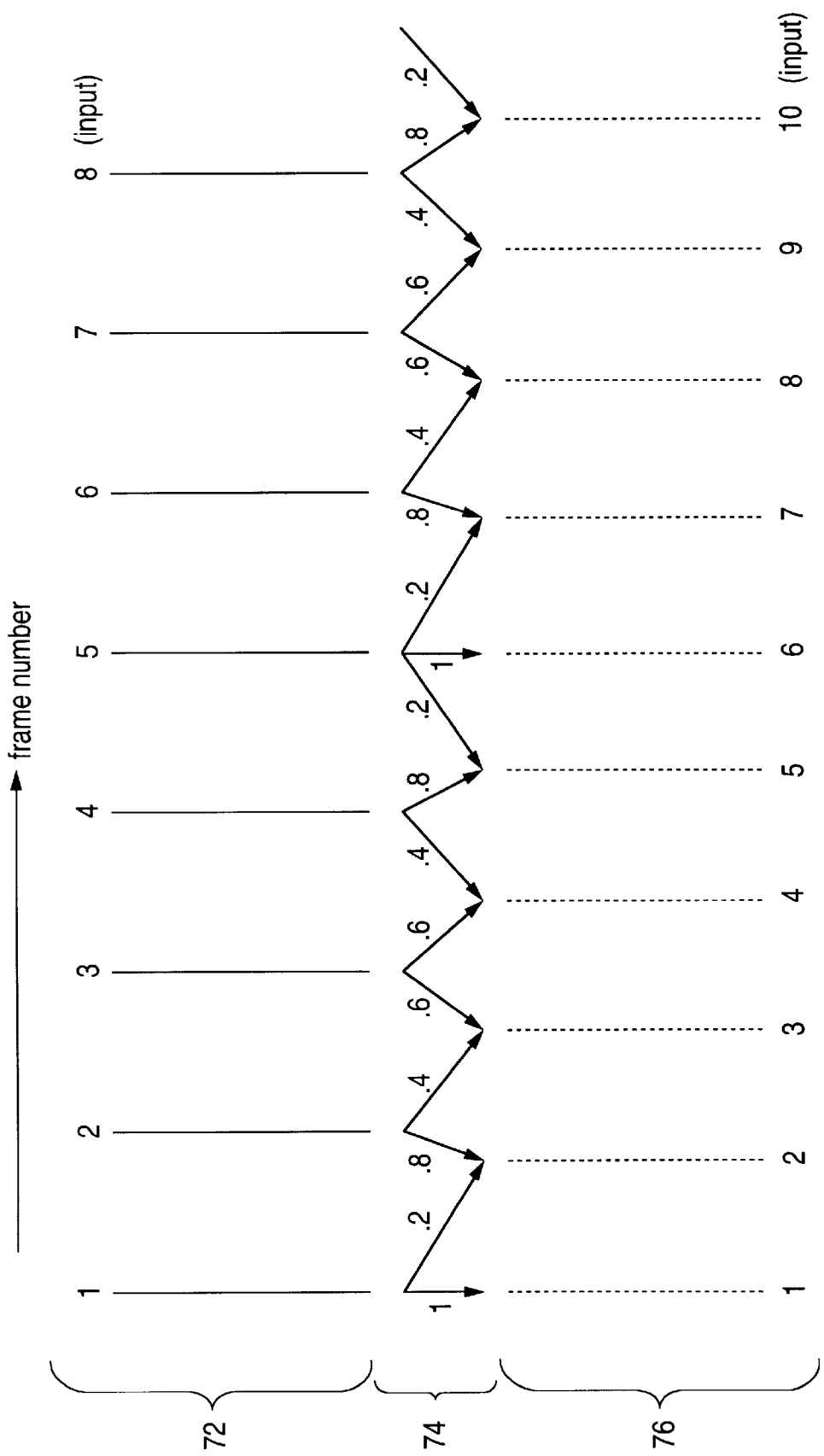
FIG. 6 is a diagram showing temporal video scaling according to the present invention.

FIG. 6 illustrates temporal video scaling with sample diagram for 24→30 frame/sec. telecine conversion, showing temporally input frames 72, as converted 74 to output frames 76. Preferably, two frames of memory are used, wherein out 2=0.2*MC_f(in_1)+0.8×MC_b(in_2), and forward and backward motion estimations are referred to as MC_f and MC_b.

Figures 7, 8, 9:
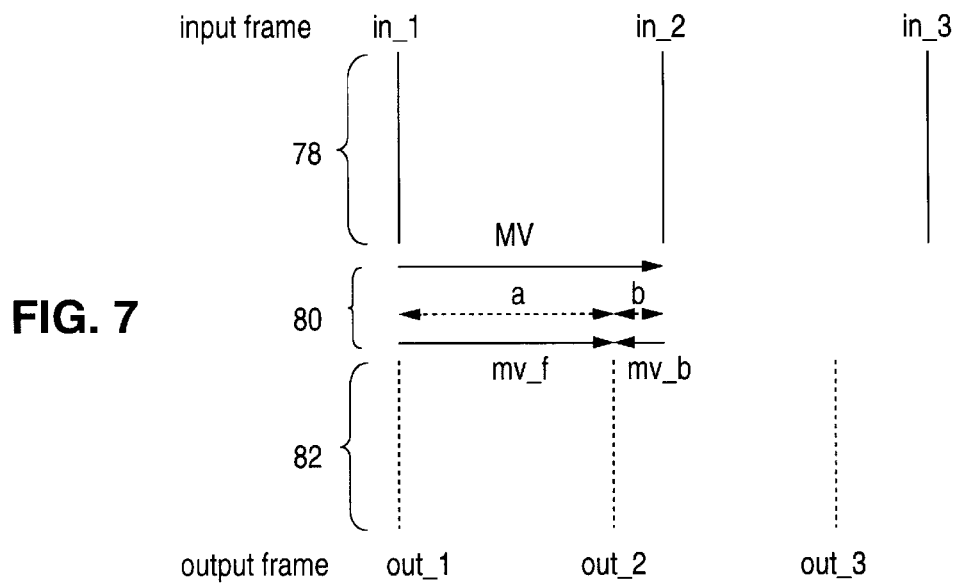
FIG. 7 is a diagram showing motion compensation for temporal video scaling according to the present invention.
FIG. 8 is a diagram showing progressively scanned video vertical scaling according to the present invention.
FIG. 9 is a diagram showing interlace scanned video vertical scaling according to the present invention.

FIG. 7 further illustrates temporal video scaling from input frames 78, as converted 80 to output frames 82, particularly including motion compensation. Here, new frame is interpolated from two neighboring frames, thereby estimating forward motion vector MV from first neighboring frame to second neighboring frame, and then scaling accordingly to abutting distances to estimate mv_f and mv_b, as provided in following:

$$s\_f\_t = a/(a+b)$$
$$s\_b\_t = b/(a+b)$$
$$mv\_f = s\_f\_t * MV = (mv\_f\_y, mv\_f\_x)$$
$$mv\_b = -s\_b\_t * MV = (mv\_b\_y, mv\_b\_x)$$
$$\text{out\_2}[j][i] = s\_b\_t * in\_1[j+mv\_f\_y][i+mv\_f\_x] +$$
$$s\_f\_t * in\_2[j+mv\_b\_y][i+mv\_b\_x]$$

During spatial processing, as shown in FIG. 4, initially vertical processing proceeds with determining Iv and Ov 32, such that vertical scaling proceeds if Iv does not equal Ov (i.e., change vertical scale) 34, otherwise proceed 56 to horizontal processing. For vertical processing, determine 36 whether input video signal is progressive-scan format 58, such that progressive format vertical scaling 38 occurs, otherwise 60 interlace format vertical scaling 40 occurs.

Moreover, during interlace format vertical scaling 40, line-doubling and de-interlacing functionality may be implemented. Line doubling is vertical scaling case wherein picture height is doubled effectively from input to output (i.e., 2:1 ratio). FIG. 11 illustrates sample basic line doubler wherein input lines 84 are doubled vertically to output lines 86, particularly using two-line memory and multiple-tap FIR filter for interlace scan format video, e.g., 2 line memories and linear interpolation to generate output lines: out_0=L0 out_1=0.75*L1+0.25*L-1, out_2=0.5*L0+0.5*L2, out_3=0.75*L1+0.25*L3, out_4=L2, out_5=0.25*L1+0.75*L3, out_6=0.5*L2+0.5*L4, and out_7=0.75*L3+0.25*L5.

FIG. 12 further illustrates sample basic line double wherein input lines 84 are doubled vertically to output lines 86 for interlace scan format video, particularly using multiple-tap FIR filter, one field, and one-line memory to generate output lines: out_0=L0, out_1=0.5*MC(L0) 0.5*L1, out_2=0.5*L0+0.5*L2, out_3=0.5*L1+0.5x*MC(L2), out_4=L2, out_5=0.5*MC(L2)+0.5*L3, out_6=0.5*L2+0.5*L4, and out_7=0.5*L3+0.5*MC(L4).

De-interlacing occurs when interlace-scan video input format changes to progressive-scan format video output. Since fields are also displaced temporally, vertical scaling as well as motion compensation provide desired de-interlaced output. FIGS. 13A–B illustrate respectively regular output interlaced display and output display de-interlacing. For example, de-interlaced output is displayed at time intervals of 1/30 second as shown in thick lines 102 in FIG. 13B relatively to regular interlaced output lines 98 in FIG. 13A. To reconstruct top-field at time intervals 1/60 second apart, motion vectors 96 are reused, e.g., using digital video decoding according to Moving Picture Experts Group 2 (MPEG2) standard. For better performance, motion vectors 96 from B1 to B2 and B2 to B3 are calculated and then halved to derive motion vectors mv2' and mv3'100.

FIGS. 14A–C further illustrates de-interlacing of input lines 84 to generate output lines 86, particularly with motion compensation using one field and two lines of memory. First field is projected at second field display time, and selection is made from motion prediction of first field and vertical scaling of second field. As shown in FIG. 14C. such selection graphically 122 is linear ramp (solid) or step function (dotted). In particular, output lines are provides as: out_0= A*MC(L0)+(1−A)*avg(L1), out_1=L1, out_2=A*MC(L2)+(1−A)*avg(L1, L3), and out_3=L3.

Schematic diagram in FIG. 14B shows input signal 104 received by motion compensation block 106 and average filter 108, which are respectively received by multiplication nodes 114, 112. A signal 110 is applied to node 114, and 1−A signal 112 applied to node 116, such that each node 114, 116 received by summing node 118 to generate output signal 120.

Motion compensation uses motion vectors (i.e., video displacement of pel from frame, field, or line to other frame, field, or line of motion video) to predict video motion and reduce redundancy, typically in temporal domain calculated in block basis (i.e., 16×16 pels), sharing motion vector per block. Such vector serves to predict motion between video blocks across different frames. Furthermore, motion compensation may be line-based, such that pels in line segment share motion vector, preferably to predict between lines across different video frames or within frame.

Referring again to FIG. 4, progressive scan video format vertical scaling 38 includes initially determining two closest input lines in same frame as output line, calculating vertical distance of input_line_1 and output_line, e.g., Av, and vertical distance of input_line_2 and output_line, e.g., Bv, and calculating output line as follows:

$$\text{output\_line}[i] = (Bv*\text{input\_line\_1}[i] + Av*\text{input\_line\_2}[i])/(Av+Bv)$$

Alternatively to foregoing sequential process technique, progressive scan video format vertical scaling may be achieved as well using combined parallel-processed scaling approach. In this combined manner, pel[n][m][k] denotes k-th pel in m-th line of n-th frame, using interframe block motion compensation, and output is provided as follows:

$$\text{output\_pel}[n'][m'][k'] =$$
$$(BtBvBh * \text{input\_pel}[n][m+mv\_f\_y][k+mv\_f\_x] +$$
$$BtBvAh * \text{input\_pel}[n][m+mv\_f\_y][k+mv\_f\_x+1] +$$
$$BtAvBh * \text{input\_pel}[n][m+mv\_f\_y+1][k+mv\_f\_x] +$$
$$BtAvAh * \text{input\_pel}[n][m+mv\_f\_y+1][k+mv\_f\_x+1] +$$
$$AtBvBh * \text{input\_pel}[n+1][m+mv\_b\_y][k+mv\_b\_x] +$$
$$AtBvAh * \text{input\_pel}[n+1][m+mv\_b\_y][k+mv\_b\_x+1] +$$
$$AtAvBh * \text{input\_pel}[n+1][m+mv\_b\_y+1][k+mv\_b\_x] +$$
$$AtAvAh * \text{input\_pel}[n+1][m+mv\_b\_y+1][k+mv\_b\_x+1])/$$
$$((At+Bt)*(Av+Bv)*(Ah+Bh))$$

FIG. 8 illustrates progressive scan video format vertical scaling of input lines 84 wherein multiple lines of memory, multiple-tap FIR filters are used to generate output lines 86, e.g., 2 line memories with linear interpolation, out_0=L0, out_1=0.25*L0+0.75*L1, out_2=0.5*L1+0.5*L2, out_3=0.75*L2+0.25*1, and out_4=L3.

Figure 10A:
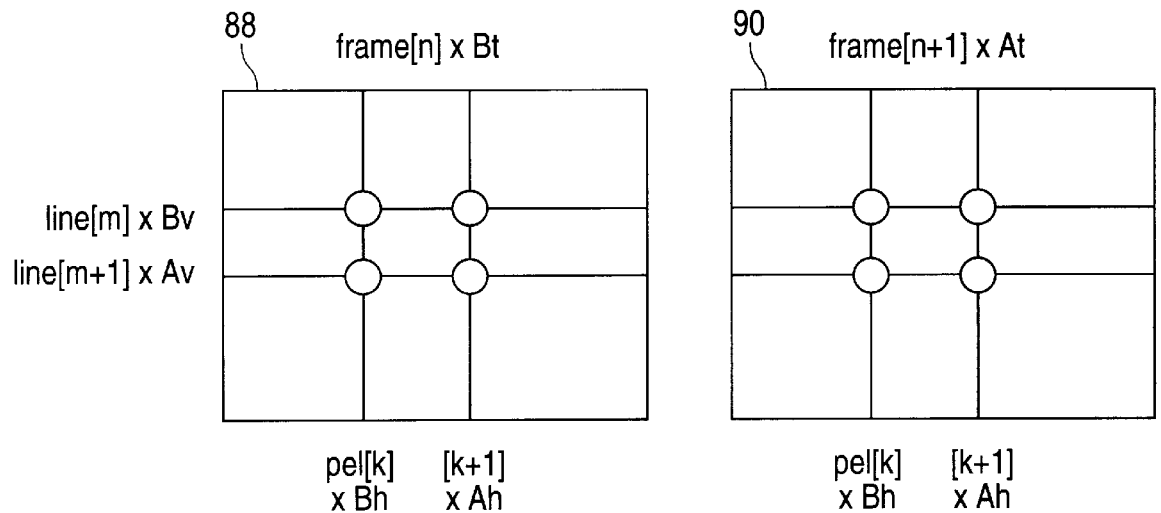
FIGS. 10A–B are diagrams showing respectively combined progressive-scanned temporal-spatial video scaler and combined interlaced-scanned temporal-spatial video scaler according to the present invention.

FIG. 10A further illustrates progressive scan video format vertical scaling, as combined temporal-spatial video scaler, wherein frame[n]×Bt 88 is disposed relative to neighboring frame [n+1]*At 90. In particular, pel[n][m][k] denotes k-th pel in m-th line of n-th frame, to provide:

$$output[n'][m'][k'] =$$
$$(BtBvBh*mc\_f(pel[n][m][k]) + BtBvAh*mc\_f(pel[n][m][k+1]) +$$
$$BtAvBh*mc\_f(pel[n][m+1][k]) +$$
$$BtAvAh*mc\_f(pel[n][m+1][k+1]) +$$
$$AtBvBh*mc\_b(pel[n+1][m][k]) +$$
$$AtBvAh*mc\_b(pel[n+1][m][k+1]) +$$
$$AtAvBh*mc\_b(pel[n+1][m+1][k]) +$$
$$AtAvAh*mc\_b(pel[n+1][m+1][k+1]))/$$
$$(At+Bt)/(Av+Bv)/(Ah+Bh)$$

where forward and backward motion compensations are referred to as mc_f( ) and mc_b( ).

Referring back to FIG. 4, interlace-scan video format vertical scaling 40 includes, in case with no field memory and no motion compensation, initially determining two closest input lines in same field as output line, calculating vertical distance of input_line_1 and output_line, e.g., Av, and vertical distance of input_line_2 and output_line, e.g., Bv, and calculating output_line as follows. Such scaling is calculated sequentially for two fields of each frame.

$$output\_line[i]=(Bv*input\_line\_1[i]+Av*input\_line\_2[i])/(Av+Bv)$$

In case of one field of memory with line-based motion compensation, first-field lines are interpolated as above, or line-based motion estimation used for output lines disposed between two input lines, wherein latter uses motion vector scaling as described herein. For lines in second field, two closest input lines in first field are determined, and current second field of output line. Vertical distance of input_line_1 and output_line, e.g., Av, and vertical distance of input_line_2 and the output_line, e.g., Bv, are calculated. If input_line_1 is in previous first field as output_line, and input_line_2 is in same second field as output_line, motion vector mv_x from input_line_1 to input-line_2 calculated, and output_line determined as follows:

$$output\_line[i]=(Bv*input\_line[i+mv\_x]+Av*input\_line\_2[i])/(Av+Bv)$$

In case of using two fields of memory with line-based motion compensation, determine for two fields of each frame two closest input lines in previous field and current field of output line. Also determine vertical distance of input_line_1 and output line, e.g., Av, and vertical distance of input_line_2 and output line, e.g., Bv. If input line_$b_1$ is in previous field as output_line and input_line_2 is in same field as output_line, calculate motion vector mv_x from input_line_1 to input_line_2, then determine output_line as follows:

$$output\_line[i]=(Bv*input\_line\_1[i+mv\_x]+Av*input\_line\_2[i])/(Av+Bv)$$

Preferably, simple motion compensation is used for line-doubling and de-interlacing procedures, including line-based motion compensation and simplified datapath and subsampling to reduce computational loads. Line-based motion compensation serves to find substantial match between input line in previous field and following closest input line in current field. Current window size c_w in current_line is matched to search window s_w in previous_line, preferably centered at same location as c_w. Displacement at best-match location is motion vector mv_x. When search is from [−d, d], i.e., s_w=c_w+2d+1, and x_c[k] denotes pels in current_line, and x_p[k] denotes pels in the previous_line, mv_x=(x in [−d, d], such that (sum of lx_c[k]−x_p[k+x]l) minimized).

Choosing larger search range d improves matching performance, whereas choosing larger c_w reduces computation load, but degrades matching performance, since more pels share same motion vector. Preferred embodiment sets d in [16, 64] and c_w in [16, 256]. Subsampling reduces computation load and increases search range. Using less bits in sum-of-absolute-difference calculation also reduces computation load essentially without substantially degrading performance. Preferably, sub-sample at 2:1 or 4:1, and use 2–6 bits in calculation instead of 8 bits. Each sample uses bit-resolution less than input bit-resolution for carrying-out motion estimation, for example, by using 2–6 bits per sample instead of 8 bits per sample for sum-of-absolute difference calculation.

Alternatively to foregoing sequential process technique, interlace scan video format vertical scaling may be achieved as well using combined parallel-processed scaling approach. In this combined manner, pel[n][m][k] denotes k-th pel in m-th line of n-th frame, using interframe block motion compensation, output is provided as follows:

$$output\_pel[n'][m'][k'] =$$
$$(BtBvBh*input\_pel[n][m+mv\_f\_y][k+mv\_f\_x] +$$
$$BtBvAh*input\_pel[n][m+mv\_f\_y][k+mv\_f\_x+1] +$$
$$BtAvBh*input\_pel[n][m+mv\_f\_y+2][k+mv\_f\_x] +$$
$$BtAvAh*input\_pel[n][m+mv\_f\_y+2][k+mv\_f\_x+1] +$$
$$AtBvBh*input\_pel[n+1][m+mv\_b\_y][k+mv\_b\_x] +$$
$$AtBvAh*input\_pel[n+1][m+mv\_b\_y][k+mv\_b\_x+1] +$$
$$AtAvBh*input\_pel[n+1][m+mv\_b\_y+2][k+mv\_b\_x] +$$
$$AtAvAh*input\_pel[n+1][m+mv\_b\_y+2][k+mv\_b\_x+1])/$$
$$((At+Bt)*(Av+Bv)*(Ah+Bh))$$

Furthermore, in such combined parallel approach for interlace scan video format vertical scaling, wherein inter-field line-based motion compensation is added, output is provided as follows:

$$output\_pel[n'][m'][k'] = (BtBvBh*input\_pel[n][m+mv\_f\_y][k+mv\_f\_x+mv\_x] +$$
$$BtBvAh*input\_pel[n][m+mv\_f\_y][k+mv\_f\_x+mv\_x+1] +$$

$BtAvBh * input\_pel[n][m + mv\_f\_y + 1][k + mv\_f\_x] +$ $BtAvAh * input\_pel[n][m + mv\_f\_y + 1][k + mv\_f\_x + 1] +$ $AtBvBh * input\_pel[n + 1][m + mv\_b\_y][k + mv\_b\_x + mv\_x] +$ $AtBvAh * input\_pel[n + 1][m + mv\_b\_y][k + mv\_b\_x + mv\_x + 1] +$ $AtAvBh * input\_pel[n + 1][m + mv\_b\_y + 1][k + mv\_b\_x] +$ $AtAvAh * input\_pel[n + 1][m + mv\_b\_y + 1][k + mv\_b\_x + 1])/$ $((At + Bt) * (Av + Bv) * (Ah + Bh))$ FIG. 9 illustrates interlace scan video format vertical scaling of input lines 84 wherein multiple line memories, multiple-tap FIR filters are used to generate output lines 86, e.g., 2 line memories with linear interpolation, out_0=L0, out_1=0.875*L1+0.125*L−1, out_2=0.25*L0+0.75*L2, out_3=0.625*L1+0.375*L3, and out_4=0.5*L2+0.5*L4.

Figure 10B:
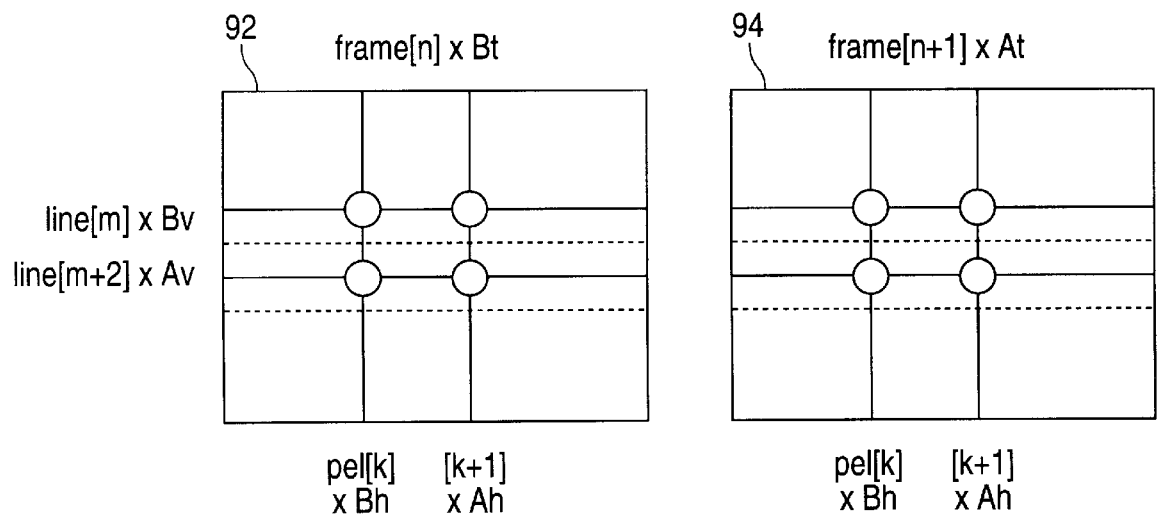

FIG. 10B further illustrates progressive scan video format vertical scaling, as combined temporal-spatial video scaler, wherein frame[n] ×Bt 92 is disposed relative to neighboring frame [n+1]*At 94. Similarly to FIG. 10A, pel[n][m][k] denotes k-th pel in m-th line of n-th frame, to provide:

$output\_pel[n'][m'][k'] = (BtBvBh * mc\_f(pel[n][m][k]) +$ $BtBvAh * mc\_f(pel[n][m][k + 1]) +$ $BtAvBh * mc\_f(pel[n][m + 1][k]) +$ $BtAvAh * mc\_f(pel[n][m + 1][k + 1]) +$ $AtBvBh * mc\_b(pel[n + 1][m][k]) +$ $AtBvAh * mc\_b(pel[n + 1][m][k + 1]) +$ $AtAvBh * mc\_b(pel[n + 1][m + 1][k]) +$ $AtAvAh * mc\_b(pel[n + 1][m + 1][k + 1]))/$ $(At + Bt) * (Av + Bv) * (Ah + Bh)$ where forward and backward motion compensations are referred to as mc_f( ) and mc_b( ).

Once again referring back to FIG. 4, horizontal scaling proceeds initially with determining Ih and Oh 42, such that horizontal scaling 48 occurs if Ih does not equal Oh (i.e., change horizontal scale) 46, otherwise 62 finish processing 50. Initially, horizontal scaling 48 includes determining two closest input pels in same line as output pel, calculating horizontal distance of input_pel_1 and output_pel, e.g., Ah, and horizontal distance of input_pel_2 and output_pel, e.g., Bh, then calculating outputpel as follows:

$output\_pel[i]=(Bh*input\_pel\_1[i]+Ah*input\_pel\_2[i])/(Ah+Bh)$

Figure 15A:
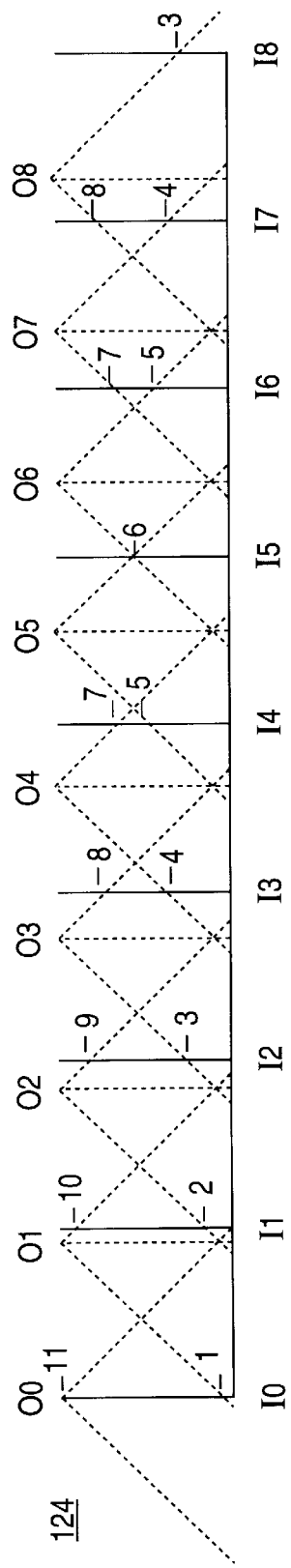
FIGS. 15A–B are diagrams showing respectively interpolation from 640-pel input to 704-pel, and similar interpolation using 3-tap filter according to the present invention.
Figure 15B:
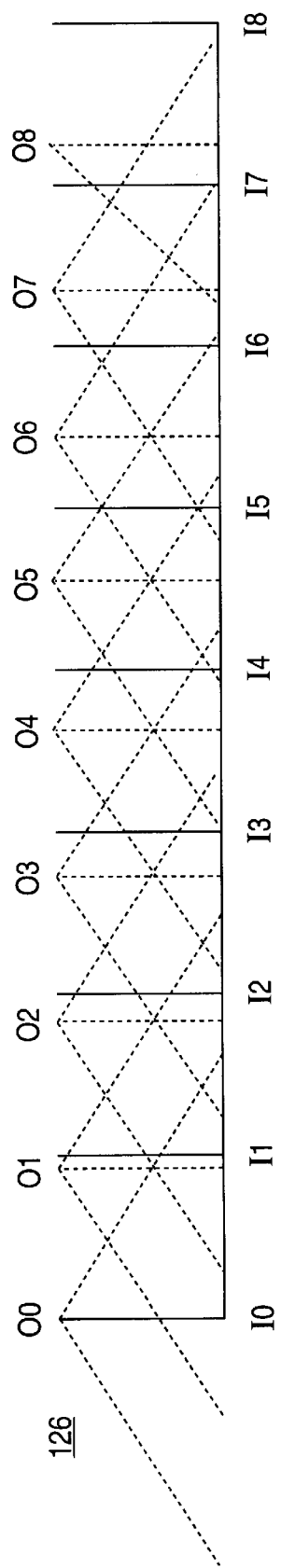

FIG. 15A illustrates horizontal video scaling, for example, interpolating from 640-pel input to 704-pel output, Ih/Oh= 10/11. Interpolation pattern 124 repeats every 11 output pels: O0=I0, O1=(I0+10*I1)/11, O2=(2*I1+9*I2)/11, O3=(3*I2+ 8*I3)/11, O4=(4*I3+7*I4)/11, O5=(5*I4+6*I5)/11, O6= (6*I5+5*I6)/11, O7=(7*I6+4*I7)/11, O8=(8*I7+3*I8)11, O9=(9*I8+2*I9)/11, and O10=(10*I9+I10)/11. FIG. 15B further illustrates horizontal video scaling, for example, interpolating from 640-pel input to 704-pel output, Ih/Oh= 10/11, in particular using 3-tap filter.

Figure 16A:
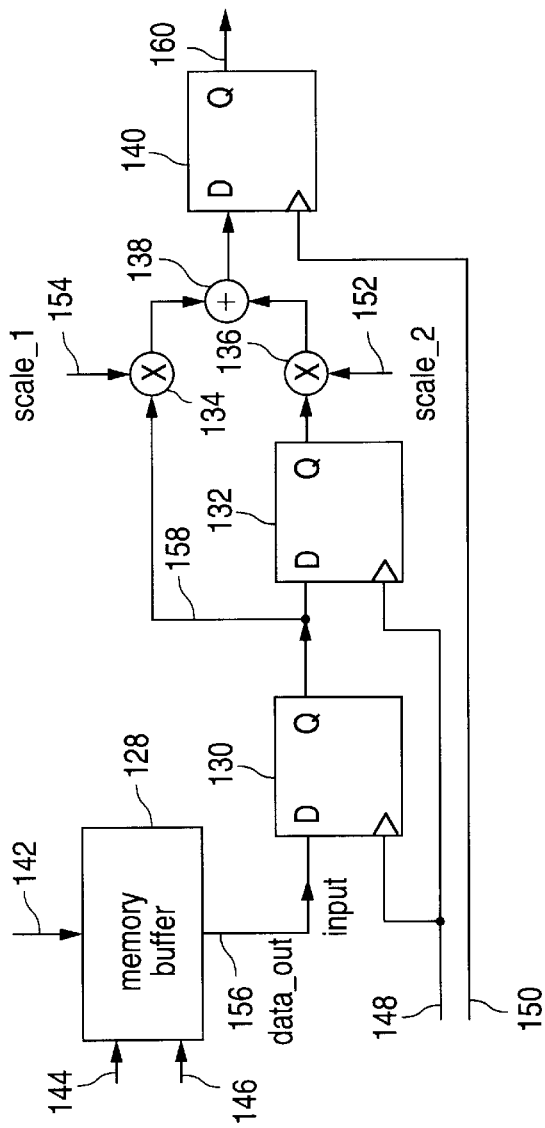
FIGS. 16A–B are schematic diagrams showing horizontal video scalers respectively synchronized using input/output clocks and shift input/output and clock signals according to the present invention.
Figure 16B:
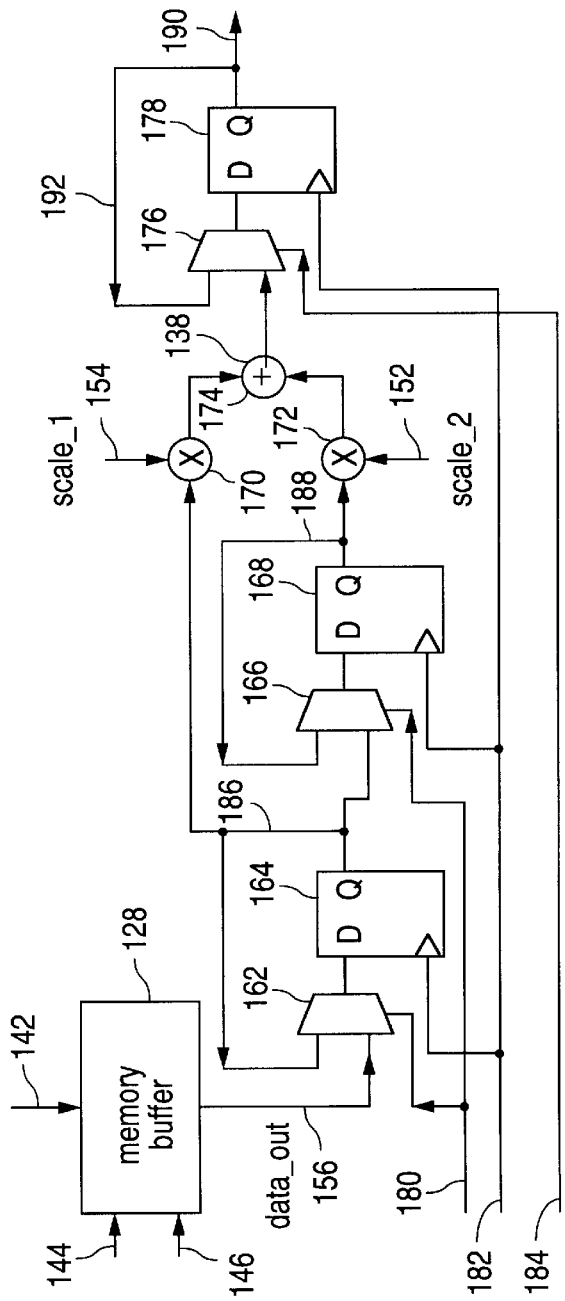

FIGS. 16A–B provide simplified schematic diagrams for illustrating horizontal video scaler. Both FIGS. 16A–B include memory buffer 128 which receive address signal 144, control signal 146 and data_in signal 142 and generate therefrom data_out signal 156. In schematic of FIG. 16A, data_out signal 156 is received by D-type flipflop 130, which is clocked by input_clock signal 148 to generate signal 158, which is applied to other D-type flipflop 132 and multiplier node 134. Flipflop 132 is clocked by input_clock 148 to generate output signal received by multiplier node 136, which receives scale_2 signal 152 to generate output signal received by summing node 138. Multiplier node 134 also receives scale_1 signal 154 to apply output signal to summing node 138 to generate summed signal for another D-type flipflop 140, which is clocked by output_clock signal 150 to generate output signal 160. As configured, memory address and control signals are generated in synchronization with input_clock 148, two scale factors scale_1 signal 154 and scale_2 signal 152 are generated in synchronization with output_clock 150, to generate scaled output 160 at desired output time.

Schematic of FIG. 16B applies data_out signal 156 to register 162 which receives signal 186 from multiplier node 170 and D-type flipflop 164 output as well as shift_input signal 180 to generate output signal received by flipflop 164, which is clocked by clock signal 182, which is also applied to other D-type flipflops 168, 178. Signal 186 is applied to register 166, which receives shift_input signal 180 and output of flipflop 168 to generate output signal received by flipflop 168. Flipflop 168 generates output signal 188, which is applied to register 166 and multiplier 172. Scale_2 signal 152 is applied to multiplier 172 which generates multiplied signal applied to summing node 174. Scale_1 signal 154 is applied to multiplier 170 which generates multiplied signal applied to node 174 to generate sum signal applied to register 176, which receives output of flipflop 178 and shift_output signal 184 to generate shift signal received by flipflop 178, which generate output signal 190. As configured, one clock signal 182 and two shift control signals 180, 184 are used for variable-size scaling. Shift_ input signal 180 is on during down-scaling, while shift_ output signal 184 is on during upscaling. FIFO-type circuit is useful during down-scaling to match output clock.

In various cases of line doubling, i.e., without temporal or horizontal scaling, vertical scaling as described above is similarly applied for (1) progressive-scan video format and interlace-scan video format wherein no field memory and motion compensation, (2) interlace-scan video format and one field of memory with motion compensation, or (3) interlace-scan video format and two fields of memory with motion compensation.

Moreover, in case of de-interlacing, i.e., without vertical or horizontal scaling, temporal interpolation and scaling of first field is applied. For first field lines, motion vector is estimated from first field of current frame to first field of next frame, when motion vector is mv_f=(mv_f_x, mv_f_y), and output is provided as follows:

output_first_field[$i,j$]=input_first_field[$i+mv\_f\_x/2, j+mv\_f\_y/2$]

Second field lines are kept intact, and output is provided as follows:

output_second_field[$i,j$]=input_second_field[$i,j$]

Furthermore, line-based motion compensation may be used to reduce computation load of generating first field projection, assuming vertical motion is relatively minor within field time.

If motion vector is substantially large, projections from first field may not appear as smooth and continuous as interpolating from second field. Hence, output-first-field is provided as follows:

output_first_field[$j$][$i$]=$A$*input_first_field[$j+mv\_f\_y/2$][$i+mv\_f\_x/2$]+(1−$A$)*(input_second_field[$j−1$][$i$]+input_second_field[$j+1$][$i$])/2

Where A is ramp function of magnitude of motion vector, as follow:

$A=1-(|mv\_f\_x|+|mv\_f\_y|)/64$ for $|mv\_f\_x|+|mv\_f\_y|<64$ $A=0$ for $|mv\_f\_x|+|mv\_f\_y|>=64$, or A can be step function as follow:

$A=1$ for $|mv\_f\_x|+|mv\_f\_y|<32$ $A=0$ for $|mv\_f\_x|+|mv\_f\_y|>=32$.

In conjunction with FIG. 4, FIGS. 5A–D show flow charts respectively for temporal, horizontal, vertical, and overall combined scaling for implementing effectively parallel variable-size spatial-temporal video scaler 70, which preferably includes linear filter for receiving interpolated scaling coefficients. In particular, scaler 70 receives video input signal 1 and generates video output signal 3 according to signals control_t signal 64 from temporal scaling control 30, control_v signal 68 from either progressive scan vertical scaling control 38 or interlace scan vertical scaling control 40, and control_h signal 66 from horizontal scaling control 48.

What is claimed is:

1. A digital filtering method for scaling a video signal, the method comprising the steps of:

receiving an input video signal;

determining at least one scaling coefficient according to a specified ratio between the input video signal and an output video signal, the at least one scaling coefficient being associated with the received signal, the ratio being reducible to a non-reducible numerator-denominator pair; and applying the received signal and the at least one scaling coefficient to a filter that spatially or temporally scales the received signal to generate the output video signal.

2. The method of claim 1 wherein:

the receiving, determining, and applying steps are implemented in a single-pass in an integrated circuit.

3. The method of claim 1 wherein:

the ratio specifies a spatial or temporal scale between the input video signal and the output video signal.

4. The method of claim 1 wherein:

the ratio specifies a vertical scale of substantially 1:2, such that total output lines are effectively double of total input lines.

5. The method of claim 1 wherein:

the filter is linear and time-varying.

6. The method of claim 1 wherein:

the filter spatially scales the received signal horizontally or vertically.

7. The method of claim 1 wherein:

the received signal is interlace or progressive scan video format.

8. The method of claim 7 further comprising the step of:

de-interlacing the received signal from interlace video format to progressive scan video format.

9. The method of claim 8 wherein:

the de-interlaced signal is motion-compensated.

10. The method of claim 1 wherein:

the filter temporally scales the received signal by converting an input frame rate to an output frame rate.

11. The method of claim 10 wherein:

the frame-rate conversion is according to telecine or inverse-telecine format.

12. The method of claim 10 wherein:

the generated signal is motion-compensated.

13. The method of claim 12 wherein:

the motion compensation is line-based.

14. The method of claim 13 wherein:

the line-based motion compensation is sub-sampled, each sample using a bit-resolution which is less than an input bit-resolution for implementing motion estimation.

15. The method of claim 1 wherein:

each scaling coefficient is calculated by bi-linear interpolation, tri-linear interpolation, quad-linear interpolation, or spine function interpolation.

16. The method of claim 1 wherein:

the filter uses a fixed-length adder or accumulator for generating the output video signal.

17. A digital filter for signal scaling comprising:

first circuit means for determining at least one scaling coefficient according to a specified ratio between an input video signal and an output video signal, the at least one scaling coefficient being associated with the input video signal, the ratio being reducible to a fractional numerator-denominator pair; and second circuit means for linear filtering according to the scaling coefficient the input video signal to scale spatially or temporally such signal to generate the output video signal.

18. A video system comprising:

first means for providing an input signal in interlace or progressive scan video format;

a video scaling circuit for spatially or temporally scaling the input signal, the circuit determining at least one scaling coefficient for the input signal for filtering the input signal to generate a scaled signal, by converting an input frame rate to an output frame rate according to a telecine format; and second means for receiving the scaled signal.

* * * * *